2 Sheets—Sheet 1.

H. PRUFROCK.

BED.

No. 11,565. Reissued Aug. 25, 1896.

Witnesses:
James A. Carr
William P. Carr.

Inventor:
Harry Prufrock.

THE NORRIS PETERS CO., WASHINGTON, D. C.

2 Sheets—Sheet 2.
H. PRUFROCK.
BED.
No. 11,565.
Reissued Aug. 25, 1896.
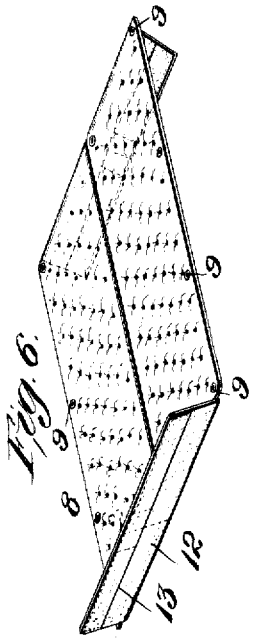
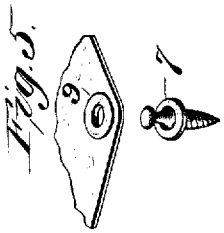
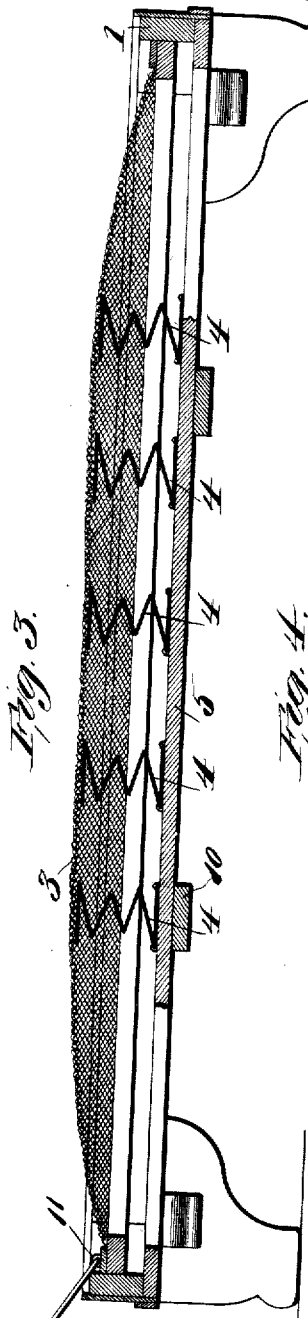
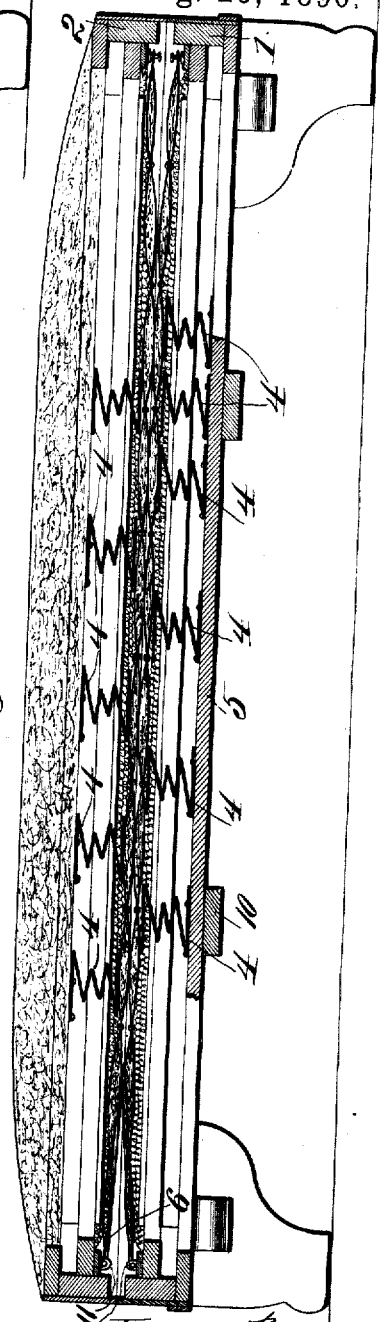
Attest:
James A. Carr
William P. Carr.
Inventor:
Harry Prufrock.
THE NORRIS PETERS CO., WASHINGTON, D. C.

UNITED STATES PATENT OFFICE.

HARRY PRUFROCK, OF ST. LOUIS, MISSOURI.

BED.

SPECIFICATION forming part of Reissued Letters Patent No. 11,565, dated August 25, 1896.

Original No. 544,489, dated August 13, 1895. Application for reissue filed September 18, 1895. Serial No. 562,912.

*To all whom it may concern:*

Be it known that I, HARRY PRUFROCK, a citizen of the United States, residing in the city of St. Louis, State of Missouri, have invented a new and useful Improvement in Beds, of which the following is a specification.

My invention relates to beds, and has for its principal objects to furnish sofa-beds, bed-lounges, bed-couches, and other similar folding beds with a suitable mattress, to provide for airing and cleaning the mattress and bed-frame, and to make the whole width of the bed-frame suitable to lie upon.

My invention consists in the parts and in the arrangements and combinations hereinafter described.

Figure 1:
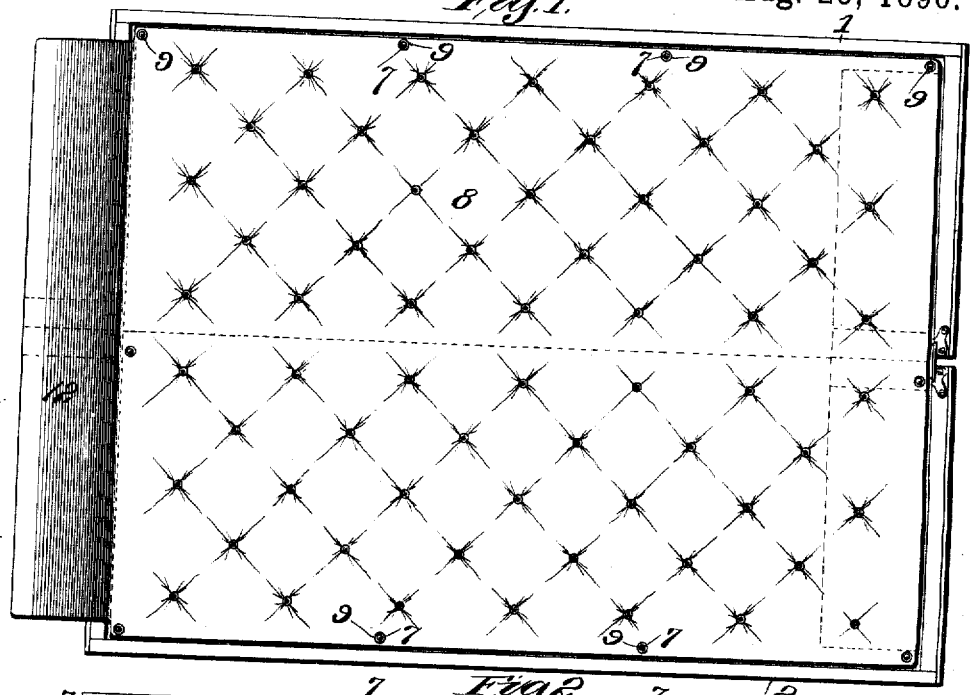
Figure 2:
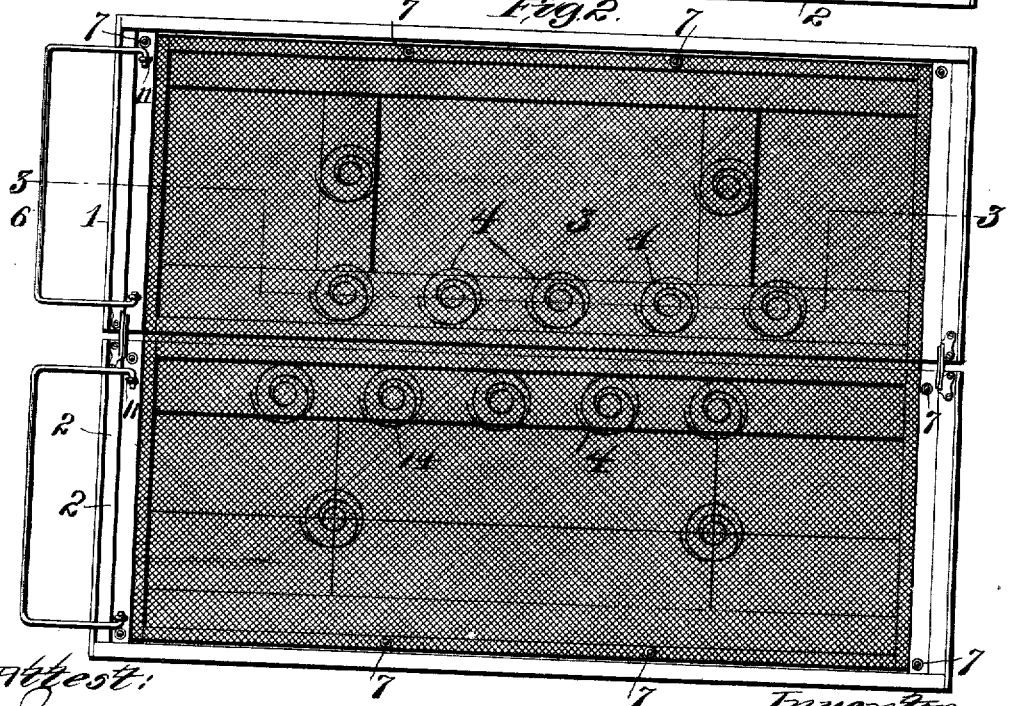

In the accompanying drawings, which form part of this specification, Figure 1 is a plan view of my bed open and with the mattress in place. Fig. 2 is a like plan view with the mattress removed. Fig. 3 is a longitudinal section on the line 3 3 of Fig. 2. Fig. 4 is a similar section with the mattress in place and the bed folded. Fig. 5 is a detail view showing the means for fastening the mattress, and Fig. 6 is a perspective view of the mattress.

Sofa-beds, bed-lounges, and like folding beds consist of sofas, lounges, couches, and other like articles of furniture in which the seat portion is hinged at the front to the main body portion of the frame, so as to swing or turn over into a horizontal position level with the main body portion.

In my device the folding frame consists of the main body portion 1 and the upholstered folding portion 2, hinged together at the front, whereby the outer portion or section may be folded over on top of the main body portion or section. A bed-bottom 3 is firmly fastened to the outer rails—that is, to those sides of the folding frame which are farther from the hinge—but is not fastened to the hinged sides or meeting-rails. This bed-bottom 3 is firmly fastened to both sections of the folding frame at the top and at the bottom thereof, and preferably almost to the hinged sides. The bed-bottom is preferably made of woven wire, but, obviously, canvas or other suitable material may be used for this purpose. The bottom is fastened to the sections of the frame preferably slightly below the tops of such sections in order to accommodate the mattress between said sections when they are folded together. The bed-bottom is supported by upholstery-springs 4. The springs of the main section 1 may be supported like springs in ordinary upholstery—for instance, by strips 10 of wood or burlap fastened to the bottom of the main section. The springs of the folding section 2 rest against the webbing or backing of the upholstered seat. The central springs are supported by the meeting-rails 5 of the two sections. These meeting-rails 5 are the rails of the frame which connect the ends of their respective sections, and which in the folded position of the bed constitute the front portion of the framework, and are generally covered with upholstery. The hinges of the frame are generally fastened to the end rails, whose upper surfaces lie flush in the open position. The meeting-rails 5 may or may not come in direct contact in the open position, but it is important that in the closed position there should be a considerable space between them. The reason for this is that when the sections are turned open the top surfaces of the meeting-rails may be far enough below the wire bottom to guard against the body of a person having to lie upon the hard meeting-rails as the wire bottom sags down with his weight. The meeting-rails 5 being thus lower than the outer side and end rails form very convenient rests for the supporting-springs. A pillow-frame 6, consisting of a simple stiff bail, is pivoted to each section at its head portion simply by passing its turned ends into screw-eyes or staples 11 provided therefor at the heads of said sections. The outer and bottom edges of each section are provided at suitable intervals with carriage hooks or buttons 7. A mattress 8 is provided at its edges with grommets or eyelets 9, adapted to fit over the buttons 7. By arranging the buttons and eyelets symmetrically the mattress may be used with either end at the head and either side on top.

For the purpose of using either end at the top the buttons and eyelets should be arranged symmetrically with reference to a center. To use either surface uppermost, they should be arranged symmetrically with reference to an axis.

It is obvious that any other suitable detachable fastening device—such, for instance, as hooks and eyes—may be substituted in place of the buttons and eyelets without materially departing from my invention.

It is preferable to have the mattress-cover extended to form a cover for the pillow-frame, as shown at 12, a slit 13 being made therein long enough to allow it to be passed over the pillow-frame. This slit may be merely the opening at the end of the mattress-cover when folded back on itself to form a pocket and left unsewed. When the mattress is to be inverted, a second slit like the first may be made in the opposite side, or small slits like buttonholes may be made in the mattress for the legs of the pillow-frame to pass through, the bails being made removable to be inserted through such holes. The like extension may be made at the other end of the mattress.

The principal advantages of my construction are as follows: It utilizes the entire space between the farther sides of the sections, rendering available several inches of space at the sides which separate bottom frames have hitherto wasted.

My device is much lighter than those having separate bottom frames, while all of its parts are accessible for ventilation and cleaning. Its most important advantage is that a removable mattress may be used, which can be removed to be aired, cleaned, changed in position, or replaced with another mattress.

In the accompanying claims the bed is assumed to be open.

What I claim as new, and desire to secure by Letters Patent, is—

1. A sofa-bed whose frame is made of sections hinged together and adapted to be folded one on top of the other, the hinges being at the front of the folded frame, said bed having a bed-bottom and a reversible detachably-fastened mattress, whereby both, at once, are folded back and forth, all substantially as and for the purpose set forth.

2. A folding bed consisting of a frame made of a body-section to the front of which the seat-section is hinged and thereby adapted to be folded on top of the body-section, a bed-bottom fastened to said body and seat sections, and a reversible mattress detachably fastened to said sections, all arranged so that the mattress is folded back and forth with the seat-section, substantially as set forth.

3. A folding bed consisting of a hinged sectional frame, a bed-bottom fastened thereto and having the meeting-rails of said sections lower than said bottom, and a reversible mattress removably fastened at its sides to said sections, all arranged so that the outer section may be folded over on top of the other section, and back, carrying with it said mattress.

4. A bed consisting of a hinged sectional frame, whose meeting-rails are lower than the side and end rails, a wire bed-bottom fastened to the outer and end rails slightly below the tops thereof, buttons on the side and end rails above the said bed-bottom, and a mattress provided in its edges with eyelets adapted to fit over said buttons, substantially as described.

5. A bed consisting of a hinged sectional frame, whose meeting-rails are lower than the side and end rails, a wire bed-bottom fastened to the outer and end rails slightly below the tops thereof, buttons on the side and end rails above the said bed-bottom, a mattress provided with eyelets in its edge adapted to fit over said buttons, said buttons and eyelets being arranged symmetrically, all substantially as and for the purpose set forth.

6. As an article of manufacture, a mattress provided near its edges with eyelets, and having a pocket extending from its end adapted to fit over a pillow-frame, substantially as and for the purpose specified.

7. In a folding bed, the combination with a frame composed of a main body portion and a folding-seat portion hinged thereto to fold thereon, of a bed-bottom secured to the outer side of said folding portions, a detachable folding mattress arranged between the folding portions of the frame, and devices for detachably securing the folding mattress on the bed-bottom, whereby the mattress will be automatically folded upon itself between the folding portions of the bed inclosing the same, and will be spread by the opening of the folding frame portions.

8. In a folding bed, the combination with a frame having a main body portion and a folding or seat portion hinged thereto to fold thereon, of a bed-bottom secured to said sections below the plane thereof when open, a detachable mattress adapted to fold down between the main body and folding seat section, and fastening devices for the mattress above the plane of the bed-bottom and below the plane of the main body and folding portions, substantially as and for the purposes specified.

9. In a folding bed the combination with a main body portion and a folding or seat portion hinged thereto to fold thereon, said portions provided with meeting-rails in a plane below the top of said folding portions when open, a bed-bottom secured to said main and folding portion below the top plane of the open sections, a detachable mattress adapted to fold down between said main body and folding seat portion, and devices for detachably fastening the mattress above the plane of the bed-bottom and below the plane of the top of the open main body and folding portions, substantially as and for the purposes specified.

10. In a folding bed, the combination with a frame having a main body portion and a folding or seat portion hinged thereto to fold thereon, of a bed-bottom secured to said sections below the plane thereof when open, a detachable and reversible mattress adapted to fold down between the main body and folding seat section, and fastening devices for the mattress above the plane of the bed-bottom and below the plane of the main body and folding portions, substantially as and for the purposes specified.

HARRY PRUFROCK.

In presence of—
JAMES A. CARR,
WILLIAM P. CARR.

Correction in Reissue Letters Patent No. 11,565.

It is hereby certified that in reissue Letters Patent No. 11,565, granted August 25, 1896, upon the application of Harry Prufrock, of St. Louis, Missouri, for an improvement in "Beds," an error appears in the printed specification requiring correction as follows, viz: In line 98, page 2, the word "inclosing" should read *in closing;* and that the said Letters Patent should be read with this correction therein that the same may conform to the record of the case in the Patent Office.

Signed, countersigned, and sealed this 1st day of September, A. D., 1896.

[SEAL.]

JNO. M. REYNOLDS,
*Assistant Secretary of the Interior.*

Countersigned:

S. T. FISHER,
*Acting Commissioner of Patents.*